US009353665B2

(12) United States Patent
Myer et al.

(10) Patent No.: US 9,353,665 B2
(45) Date of Patent: May 31, 2016

(54) AMMONIA GENERATION SYSTEM FOR AN SCR SYSTEM

(71) Applicant: Cummins Emission Solutions, Inc., Columbus, IN (US)

(72) Inventors: Andrew Morgan Myer, Greenwood, IL (US); Stephen M. Holl, Columbus, IN (US); Omkar Tendolkar, Columbus, IN (US); John D. Crofts, Edinburgh, IN (US); Samuel Johnson, Bloomington, IN (US); Ambarish D. Khot, Pune (IN)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/486,808

(22) Filed: Sep. 15, 2014

(65) Prior Publication Data
US 2016/0076420 A1    Mar. 17, 2016

(51) Int. Cl.
*B01D 53/94* (2006.01)
*F01N 3/20* (2006.01)

(52) U.S. Cl.
CPC ............ *F01N 3/208* (2013.01); *B01D 53/9431* (2013.01); *B01D 53/9495* (2013.01); *B01D 2251/2062* (2013.01); *F01N 2240/25* (2013.01); *F01N 2610/02* (2013.01); *F01N 2610/14* (2013.01); *F01N 2610/148* (2013.01); *F01N 2900/1404* (2013.01)

(58) Field of Classification Search
CPC .... B01D 53/9409; F01N 3/206; F01N 3/2066
See application file for complete search history.

(56) References Cited

U.S. PATENT DOCUMENTS

| 4,995,955 | A | * | 2/1991 | Kim | B01J 19/123 |
| | | | | | 204/157.2 |
| 7,498,009 | B2 | * | 3/2009 | Leach | B01D 53/007 |
| | | | | | 204/157.3 |
| 8,341,942 | B2 | | 1/2013 | Brück et al. | |
| 2008/0038180 | A1 | * | 2/2008 | Spokoyny | B01D 53/56 |
| | | | | | 423/358 |
| 2009/0038298 | A1 | * | 2/2009 | Patterson | B01D 53/90 |
| | | | | | 60/299 |
| 2014/0096511 | A1 | * | 4/2014 | Grass | F01N 3/2066 |
| | | | | | 60/274 |

FOREIGN PATENT DOCUMENTS

| DE | 102007062704 | A1 | * | 7/2009 | ............ F01N 3/2066 |
| JP | 63287534 | A | * | 11/1988 | ............ B01D 53/34 |
| JP | 01011628 | A | * | 1/1989 | ............ B01D 53/34 |
| JP | 5680104 | B2 | * | 3/2015 | ............ F01N 3/2066 |
| RU | 2012126529 | A | * | 1/2014 | ............ F01N 3/2066 |
| WO | WO 201402374 | A1 | * | 12/2014 | ............ F01N 3/2066 |

* cited by examiner

*Primary Examiner* — Timothy Vanoy
(74) *Attorney, Agent, or Firm* — Foley & Lardner LLP

(57) ABSTRACT

A system including a reductant source storing reductant, an ammonia generation system configured to generate gaseous ammonia via cavitation, and a gaseous ammonia delivery device in fluid communication with the ammonia generation system and an exhaust system. The system may selectively activate the ammonia generation system responsive to a detected temperature of an exhaust gas of an exhaust system being equal to or below a predetermined value. The ammonia generation system may utilize ultrasonic cavitation or laser cavitation to generate gaseous ammonia to be delivered to the exhaust system responsive to the temperature of the exhaust gas of the exhaust system being equal to or below the predetermined value. If the temperature of the exhaust gas of the exhaust system above the predetermined value, a dosing module to dose reductant to the exhaust system may be activated.

27 Claims, 6 Drawing Sheets

AMMONIA GENERATION SYSTEM FOR AN SCR SYSTEM

TECHNICAL FIELD

The present application relates generally to the field of aftertreatment systems for internal combustion engines. More specifically, the present application relates to ammonia generation systems for SCR aftertreatment systems.

BACKGROUND

For internal combustion engines, such as diesel engines, nitrogen oxides ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. In some instances, the reductant may be converted into gaseous ammonia prior to being dosed into an exhaust pipe of the exhaust system. That is, in some situations, it may be preferable to convert reductant into ammonia prior to dosing into the exhaust pipe, such as during cold exhaust system conditions.

SUMMARY

One implementation relates to a system that includes an exhaust system having a SCR catalyst, a reductant source storing reductant, and an ammonia generation system configured to generate gaseous ammonia via cavitation. The ammonia generation system may be in fluid communication with the reductant source.

Another implementation relates to an apparatus including a first module configured to receive data indicative of a temperature of an exhaust gas of an exhaust system from a temperature sensor and to determine the received data indicative of the temperature of the exhaust gas is equal to or below a predetermined value. The apparatus may also include a second module configured to activate an ammonia generation system to produce ammonia via cavitation responsive to the first module determining the data indicative of the temperature of the exhaust gas is equal to or below the predetermined value.

Yet a further implementation relates to method including receiving data indicative of a temperature of an exhaust gas of an exhaust system from a temperature sensor. The method also includes determining the received data indicative of the temperature of the exhaust gas is equal to or below a predetermined value. The method further includes selectively activating an ammonia generation system configured to generate ammonia via cavitation responsive to determining the received data indicative of the temperature of the exhaust gas is equal to or below the predetermined value or selectively activating a dosing module responsive to determining the received data indicative of the temperature of the exhaust gas is above the predetermined value.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for injecting and mixing reductant into an exhaust flow of a vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust systems with SCR systems, various dosing modules and/or exhaust pipe configurations may be utilized. For instance, air-assisted or airless dosing modules may be utilized. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. In some instances, the reductant may be converted into gaseous ammonia prior to being dosed into an exhaust pipe of the exhaust system. That is, in some situations, it may be preferable to convert reductant into ammonia prior to dosing into the exhaust pipe, such as during cold exhaust system conditions. An ammonia generation system may be used that generates gaseous ammonia via cavitation. The gaseous ammonia may be generated via ultrasonic cavitation or laser cavitation.

II. Overview of Aftertreatment System

Figure 1:
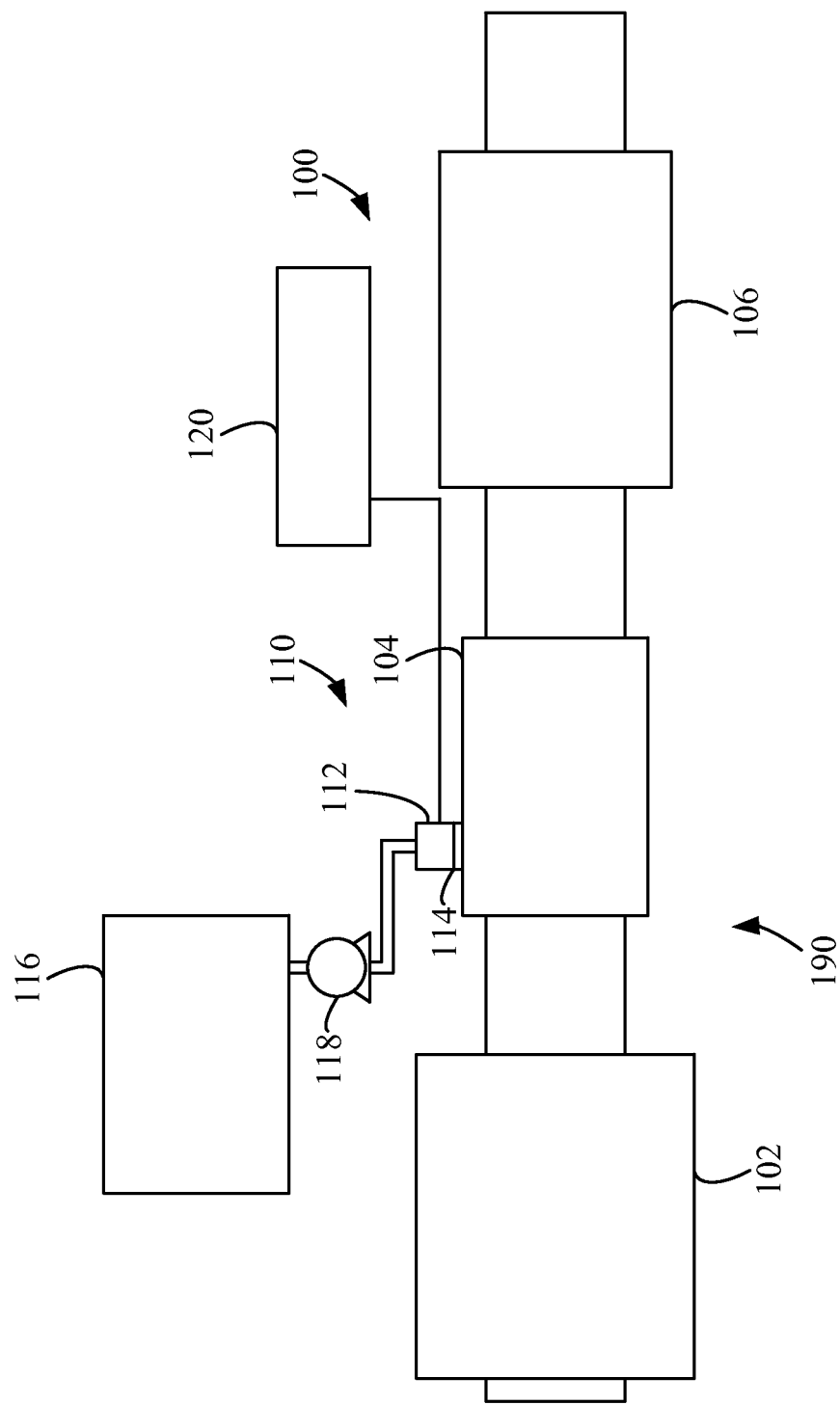
FIG. 1 is a block schematic diagram of a selective catalytic reduction system having a reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NO emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant source 116 for delivery to the dosing module 112.

The dosing module 112 is also electrically or communicatively coupled to a controller 120. The controller 120 is configured to control the dosing module 112 to dose reductant into the decomposition chamber 104. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The controller 120 may be structured to perform certain operations described herein. In certain implementations, the controller 120 forms a portion of a processing subsystem including one or more computing devices having memory, processing, and/or communication hardware. The controller 120 may be a single device or a distributed device, and the functions of the controller may be performed by hardware and/or as computer instructions on a non-transient computer readable storage medium.

In certain embodiments, the controller 120 includes one or more modules structured to functionally execute the operations of the controller 120. The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some conditions, such as when a temperature of the exhaust system 190 is below a certain temperature (e.g., below 160° C., below 200° C., below 250° C., etc.), it may be difficult or less efficient to for dosed reductant droplets to undergo the processes of evaporation, thermolysis, and hydrolysis to form gaseous ammonia within the exhaust system 190. That is, at low temperatures, the dosed reductant from the dosing module 112 may not be converted or may be converted at a low rate into gaseous ammonia prior to the SCR catalyst 106. Accordingly, it may be useful to generate gaseous ammonia upstream of the SCR catalyst 106 to reduce the $NO_x$ emissions. Moreover, the generation of gaseous ammonia does not introduce urea into the decomposition reactor or tube. Thus, urea deposit formation may be substantially avoided when gaseous ammonia is introduced into the exhaust system. In some instances, gaseous ammonia may be introduced until the exhaust gas temperature is at sufficiently high temperature such that the occurrence of urea deposits is substantially reduced (e.g., the surface temperature of the exhaust piping is at a high enough temperature that contact with urea does not or substantially reduces the formation of urea deposits).

III. Implementations of Reductant Delivery Systems Having Ammonia Generation Systems Referring generally to FIGS. 2-4, ammonia generation systems 216, 316, 416 may be implemented to generate gaseous ammonia for reducing $NO_x$ emissions using the SCR catalyst 106. The ammonia generation systems 216, 316, 416 may be utilized when a temperature of an exhaust gas is below a predetermined temperature, such as below 160° C., below 200° C., etc. That is, a temperature sensor 218, 318, 418 may be utilized to detect a temperature of the exhaust gas flowing through the exhaust system 190. If the detected temperature is below the predetermined temperature, then the ammonia generation system 216, 316, 416 may be activated to generate gaseous ammonia for introduction into the exhaust system 190. Thus, even at cold temperatures, the reductant delivery systems 200, 300, 400 may be configured to introduce ammonia or other gaseous reductants to the exhaust system 190 for reducing $NO_x$ emissions. In some instances, such as the ammonia generation systems 216, 316, 416 may be activated whenever the temperature of the exhaust gas is below the predetermined temperature. Thus, the controller 120 may be configured to switch between introducing gaseous ammonia via an ammonia generation system 216, 316, 416 and dosing reductant, such as urea, via a dosing module 112 when the detected temperature of the exhaust gas is below and/or above the predetermined temperature. Thus, even if a vehicle has been operating (i.e., not a cold start), the ammonia generation systems 216, 316, 416 may be utilized to generate gaseous ammonia when the temperature of the exhaust gas is below the predetermined temperature. For instance, a temperature of the exhaust gas may fall below the predetermined temperature during transit in a city when the vehicle is idling or in stop-and-go traffic. The ammonia generation systems 216, 316, 416 may be utilized to generate gaseous ammonia for reducing $NO_x$ emissions using the SCR catalyst 106 such that urea deposits are less likely to form and/or $NO_x$ emissions may be further reduced than when dosing reductant via the dosing module 112.

Figure 2:
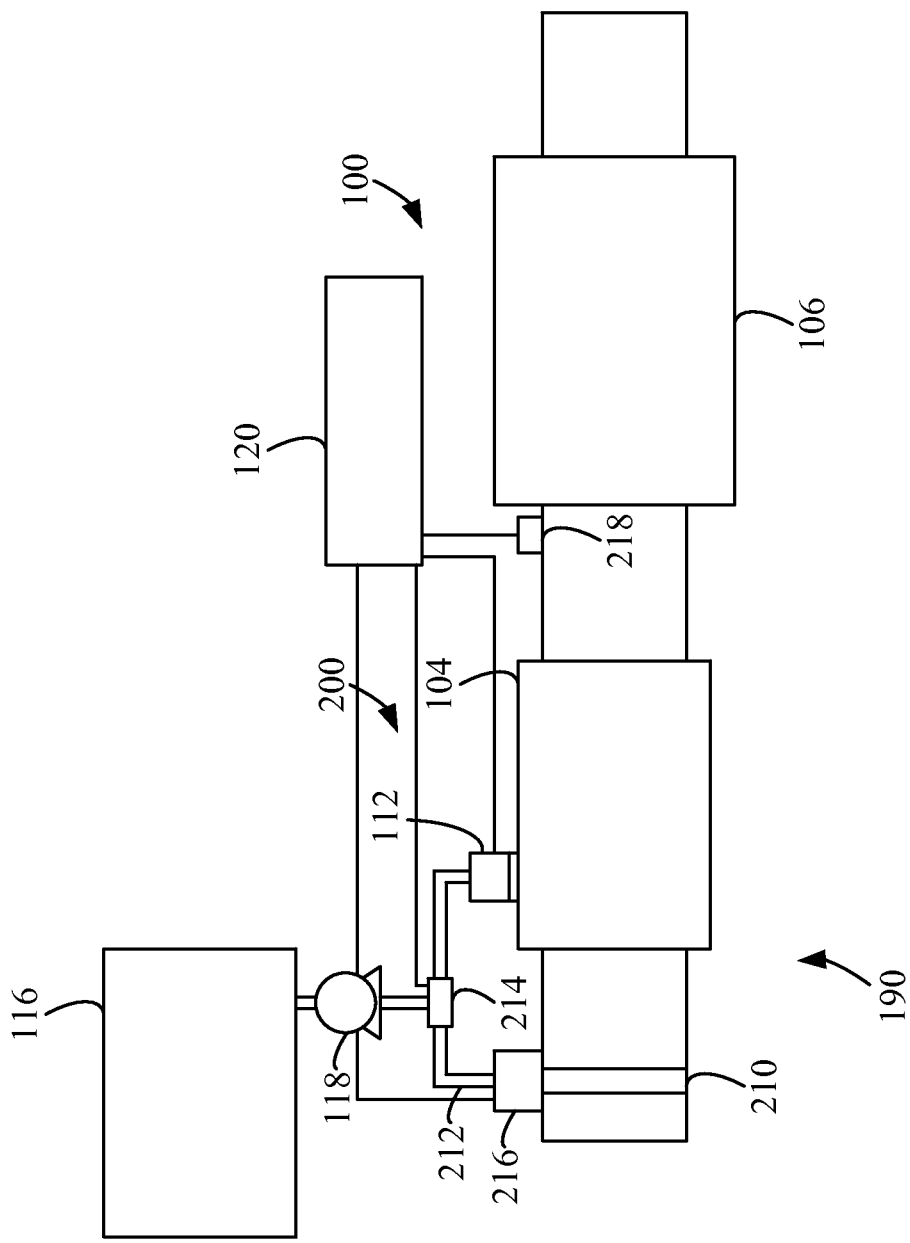
FIG. 2 is a block diagram of an implementation of a reductant delivery system having an ammonia generation system.

Referring to FIG. 2, a reductant delivery system 200 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant source 116 for delivery to the dosing module 112.

The dosing module 112 is electrically or communicatively coupled to the controller 120. The controller 120 is configured to control the dosing module 112 to dose reductant into the decomposition chamber 104. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The reductant delivery system 200 further includes a gaseous ammonia delivery device 210, an ammonia generation system 216, a valve 214, and an inlet line 212. In the implementation shown, the valve 214 may be electrically or communicatively coupled to the controller 120 such that the controller 120 may modify a condition of the valve 214, such as to direct reductant pumped by the pump 118 to the dosing module 112 or to the ammonia generation system 216. The valve 214 may be a three port solenoid valve for switching between the inlet line 212 to the ammonia generation system 216 and the line to the dosing module 112. Other valves 214 for switching between the inlet line 212 to the ammonia generation system 216 and the line to the dosing module 112 may be used as well. The valve 214 is in fluid communication with an outlet line from the pump 118 for receiving pumped reductant from the reductant source 116, such as a reductant tank, and in fluid communication with the inlet line 212 to the ammonia generation system 216 and the line to the dosing module 112 to selectively provide reductant to the ammonia generation system 216 or the dosing module 112.

In the implementation depicted in FIG. 2, the reductant delivery system 200 includes a temperature sensor 218 electrically or communicatively coupled to the controller 120. The temperature sensor 218 may be configured to detect a temperature of the exhaust gas flowing through the exhaust system 190 and provide data indicative of the detected temperature to the controller 120. As will be described in greater detail below in reference to FIG. 6, the data indicative of the detected temperature of the exhaust gas may be utilized for controlling the valve 214 and/or the ammonia generation system 216.

The inlet line 212 to the ammonia generation system 216 is in fluid communication with an inlet to the ammonia generation system 216 for providing liquid reductant to the ammonia generation system 216. The ammonia generation system 216 may be a system configured to utilize cavitation of a fluid, such as the liquid reductant provided by the inlet line 212, to generate nearly instantaneous thermolysis and decomposition of the fluid. The ammonia generation system 216 may, in some implementations, be configured to result in cavitation of the fluid that results in pressure and temperature thresholds near 1000 atm and 5000° K, respectively. Such conditions may result in the near instantaneous (e.g., on the order of 10 ms) thermolysis and decomposition of a reductant, such as DEF, into decomposed constituents of $NH_3$, $H_2O$, and $CO_2$.

In some implementations, the ammonia generation system 216 utilizes sonochemistry to decompose the reductant via sonic cavitation. Sonochemistry utilizes ultrasonic excitation of a fluid, such as the reductant, to generate cavitation bubbles and chemical reactions, such as decomposition of the reductant, such as DEF, into decomposed constituents of $NH_3$, $H_2O$, and $CO_2$. The ammonia generation system 216 may include an ultrasonic transducer having one or more piezoelectric elements for generating ultrasonic waves. The ammonia generation system 216 may receive liquid reductant via the inlet line 212 and include the ultrasonic transducer directed at a portion of the received liquid for generating ultrasonic cavitation in the received liquid reductant. The ammonia generation system 216 may introduce the gaseous ammonia to the exhaust system 190 via the gaseous ammonia delivery device 210. For instance, the ammonia generation system 216 may be in fluid communication with the gaseous ammonia delivery device 210 such that gaseous ammonia produced by the ultrasonic transducer of the ammonia generation system 216 is collected and supplied to an inlet of the gaseous ammonia delivery device 210. The gaseous ammonia delivery device may take the form, for example, of one more tubes or conduits, as described in greater detail below. Thus, the ammonia generation system 216 may provide gaseous ammonia to the exhaust system 190, even at low temperatures for the exhaust gas.

In other implementations, the ammonia generation system 216 utilizes a laser to decompose the reductant via laser cavitation. A laser may be used to excite and superheat a fluid, such as the reductant, to generate cavitation bubbles and chemical reactions, such as decomposition of the reductant, such as DEF, into decomposed constituents of $NH_3$, $H_2O$, and $CO_2$. The ammonia generation system 216 may include one or more lasers that output a highly focused laser pulse in a liquid, such as the reductant from the inlet line 212, to break down the molecules in the liquid and generate ionized hot plasma near the focal point of the laser pulse from the one or more lasers. The generated hot plasma recombines, heats the liquid, and creates a vapor bubble, resulting in laser cavitation of the liquid. Laser pulses into a standing fluid, such as the reductant, results in the formation of unstable bubbles which immediately undergo cavitation. The ammonia generation system 216 may receive liquid reductant via the inlet line 212 and include the one or more lasers directed at a portion of the received liquid for generating laser cavitation in the received liquid reductant. The ammonia generation system 216 may introduce the gaseous ammonia to the exhaust system 190 via the gaseous ammonia delivery device 210. For instance, the ammonia generation system 216 may be in fluid communication with the gaseous ammonia delivery device 210 such that gaseous ammonia produced by the one or more lasers of the ammonia generation system 216 is collected and supplied to an inlet of the gaseous ammonia delivery device 210. Thus, the ammonia generation system 216 may provide gaseous ammonia to the exhaust system 190, even at low temperatures for the exhaust gas.

In the implementation shown in FIG. 2, the gaseous ammonia delivery device 210 is positioned upstream of the decomposition chamber 104 such that gaseous ammonia may flow through the decomposition chamber 104 to disperse within the exhaust gas flowing through the exhaust system 190 prior to the SCR catalyst 106.

Figure 3:
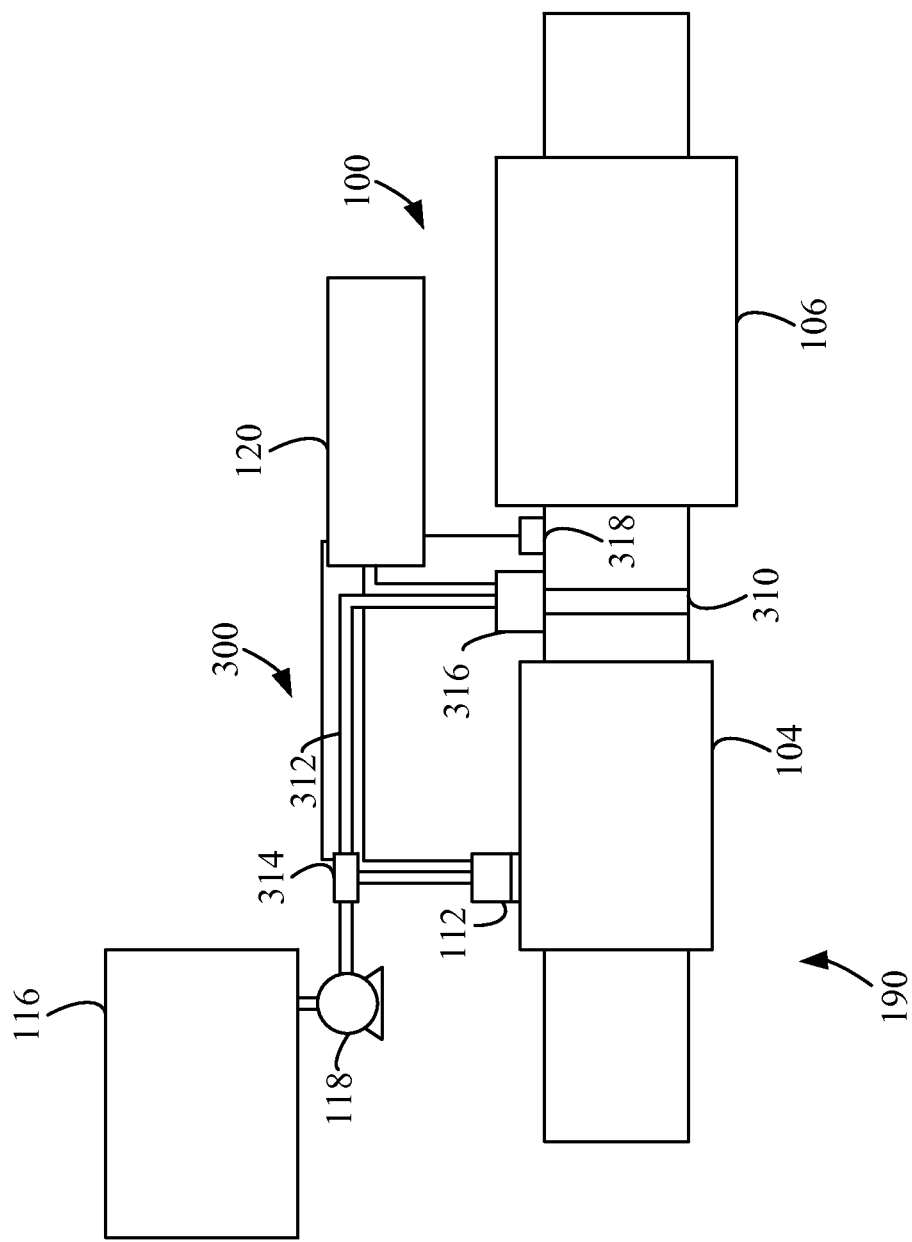
FIG. 3 is a block diagram of another implementation of a reductant delivery system having an ammonia generation system.

FIG. 3 depicts another implementation of a reductant delivery system 300 including a gaseous ammonia delivery device 310, an ammonia generation system 316, a valve 314, and an inlet line 312. The reductant delivery system 300 is substantially similar to the reductant delivery system 200 of FIG. 2. The gaseous ammonia delivery device 310, ammonia generation system 316, valve 314, inlet line 312, and temperature sensor 318 may be constructed and/or configured in substantially the same way as gaseous ammonia delivery device 210, an ammonia generation system 216, a valve 214, an inlet line 212, and temperature sensor 218 of FIG. 2. The gaseous ammonia delivery device 310 of FIG. 3 is downstream of the decomposition reactor 104 and upstream of the SCR catalyst 106. Thus, gaseous ammonia may be introduced into the exhaust system 190 after the decomposition reactor 104. In some implementations, the gaseous ammonia delivery device 310 may be integrated into or be a mixing device for also mixing reductant dosed by the dosing module 112. Thus, during low temperature conditions when it may be difficult or less efficient to for dosed reductant droplets to undergo the processes of evaporation, thermolysis, and hydrolysis to form gaseous ammonia within the exhaust system 190, the gaseous ammonia delivery device 310 may be utilized for introducing gaseous ammonia generated by the ammonia generation system 316. When higher temperature conditions exist (e.g., above 160° C., above 200° C., etc.), the gaseous ammonia delivery device 310 may be utilized as a mixing device for mixing dosed reductant droplets from the dosing module 112 and/or ammonia from the dosed reductant droplets with exhaust gas of the exhaust system 190.

Figure 4:
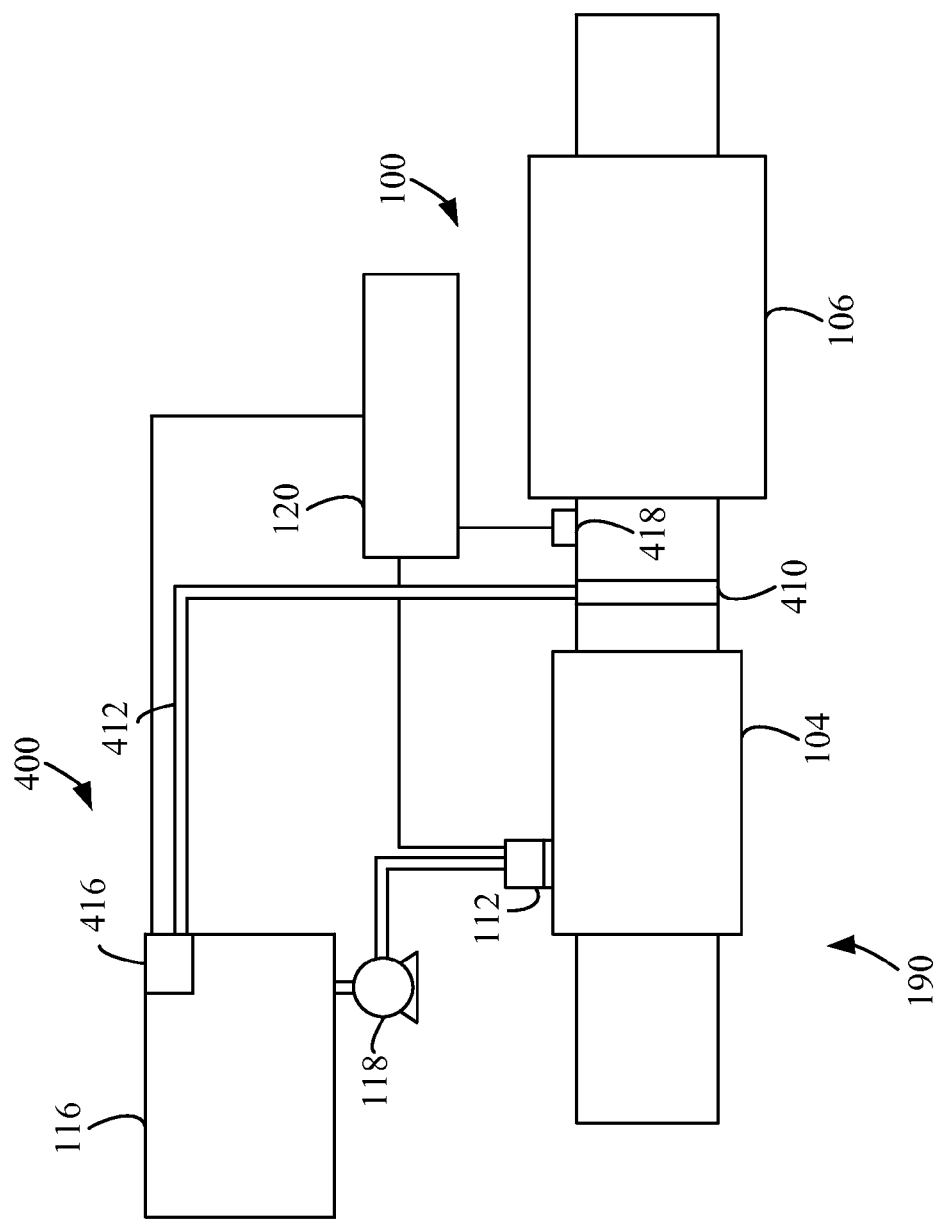
FIG. 4 is a block diagram of still another implementation of a reductant delivery system having an ammonia generation system.

FIG. 4 depicts yet another implementation of a reductant delivery system 400 including a gaseous ammonia delivery device 410, an ammonia generation system 416, and an ammonia delivery line 412. In the implementation depicted, the ammonia generation system 416 is in fluid communication with the reductant source 116 upstream of the pump 118. In some implementations, the ammonia generation system 416 may be integrated into the reductant source 116, such as into a reductant tank. The ammonia generation system 416 may utilize sonochemistry to decompose the reductant from the reductant source 116 via sonic cavitation. The ammonia generation system 416 may include an ultrasonic transducer having one or more piezoelectric elements for generating ultrasonic waves. The ammonia generation system 416 may receive liquid reductant from the reductant source 116 and include the ultrasonic transducer directed at a portion of the received liquid reductant for generating ultrasonic cavitation in the received liquid reductant and/or the ammonia generation system 416 may have an ultrasonic transducer directed at a portion of the liquid reductant stored in the reductant source 116. In some implementations, the gaseous ammonia generated by the ammonia generation system 416 may be collected and introduced to the exhaust system 190 via an ammonia delivery line 412 and a gaseous ammonia delivery device 410. For instance, the ammonia generation system 416 may be in fluid communication with the gaseous ammonia delivery device 410 via the ammonia delivery line 412 such that gaseous ammonia produced by the ultrasonic transducer of the ammonia generation system 416 is collected and supplied to an inlet of the gaseous ammonia delivery device 410 via the ammonia delivery line 412. Thus, the ammonia generation system 416 may provide gaseous ammonia to the exhaust system 190, even at low temperatures for the exhaust gas.

In other implementations, the ammonia generation system 416 utilizes a laser to decompose the reductant via laser cavitation. The ammonia generation system 416 may include one or more lasers that output a highly focused laser pulse in a liquid, such as reductant, to break down the molecules in the liquid and generate ionized hot plasma near the focal point of the laser pulse from the one or more lasers. The generated hot plasma recombines, heats the liquid, and creates a vapor bubble, resulting in laser cavitation of the liquid. Laser pulses into a standing fluid, such as the reductant, results in the formation of unstable bubbles which immediately undergo cavitation. The ammonia generation system 416 may receive liquid reductant received from the reductant source 116 and include the one or more lasers directed at a portion of the received liquid for generating laser cavitation in the received liquid reductant. In other implementations, the ammonia generation system 416 may include one or more lasers directed at a portion of the liquid of the reductant source 116 for generating laser cavitation in the reductant. In some implementations, the gaseous ammonia generated by the ammonia generation system 416 is collected and introduced to the exhaust system 190 via an ammonia delivery line 412 and a gaseous ammonia delivery device 410. For instance, the ammonia generation system 416 may be in fluid communication with the gaseous ammonia delivery device 410 via the ammonia delivery line 412 such that gaseous ammonia produced by the one or more lasers of the ammonia generation system 416 is collected and supplied to an inlet of the gaseous ammonia delivery device 410 via the ammonia delivery line 412. Thus, the ammonia generation system 416 may provide gaseous ammonia to the exhaust system 190, even at low temperatures for the exhaust gas.

In the implementation depicted in FIG. 4, the reductant delivery system 400 includes a temperature sensor 418 electrically or communicatively coupled to the controller 120. The temperature sensor 418 may be configured to detect a temperature of the exhaust gas flowing through the exhaust system 190 and provide data indicative of the detected temperature to the controller 120. As will be described in greater detail below in reference to FIG. 6, the data indicative of the detected temperature of the exhaust gas may be utilized for controlling the ammonia generation system 416.

In some implementations, the gaseous ammonia delivery device 410 may be integrated into or be a mixing device for also mixing reductant dosed by the dosing module 112. Thus, during low temperature conditions when it may be difficult or less efficient to for dosed reductant droplets to undergo the processes of evaporation, thermolysis, and hydrolysis to form gaseous ammonia within the exhaust system 190, the gaseous ammonia delivery device 410 may be utilized for introducing gaseous ammonia generated by the ammonia generation system 416. When higher temperature conditions exist (e.g., above 160° C., above 200° C., etc.), the gaseous ammonia delivery device 410 may be utilized as a mixing device for mixing dosed reductant droplets from the dosing module 112 and/or ammonia from the dosed reductant droplets with exhaust gas of the exhaust system 190.

Figure 5:
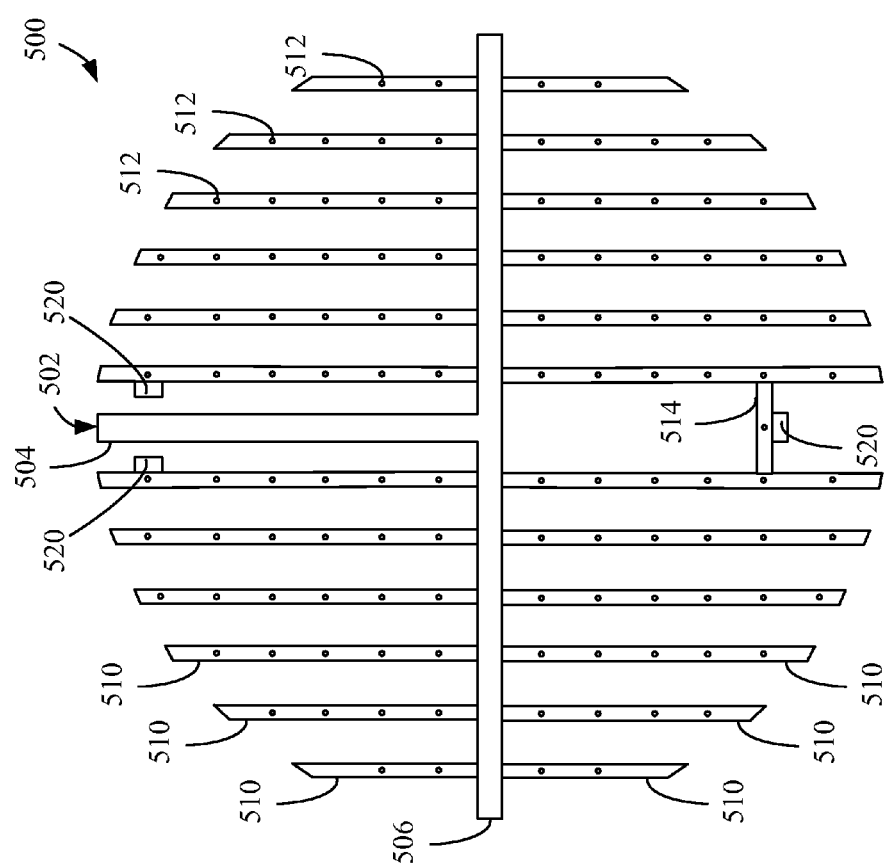
FIG. 5 is a front elevation view of an implementation of a gaseous ammonia delivery device having a plurality of conduits and baffles.

FIG. 5 depicts an example of a gaseous ammonia delivery device 500 that may be deployed within the exhaust system 190 of FIGS. 2-4 as the gaseous ammonia delivery device 210, 310, 410. The gaseous ammonia delivery device 500 includes an inlet 502, a first conduit 504, a second conduit 506, and a plurality of conduits 510. The inlet 502 is configured to be fluidly coupled to and in fluid communication with a gaseous ammonia source, such as gaseous ammonia produced by the ammonia generation system 216, 316, 416 of FIGS. 2-4. The first conduit 504 is in fluid communication with the inlet 502 and extends downwardly from the inlet 502. The second conduit 506 is in fluid communication with the first conduit 504 such that the second conduit 506 transports the gaseous ammonia received at the inlet 502. In the present example, the second conduit 506 is coupled to the first conduit 504 at an end of the first conduit 504 that is opposite the inlet 502. The second conduit 506 extends outwardly in opposing directions relative to the coupling to the first conduit 504 such that the second conduit 506 and the first conduit 504 form a T shape with the second conduit 506 substantially perpendicular to the first conduit 504. In some implementations, a bluff body, may be added to the intersecting portion of the first conduit 504 and the second conduit 506. In some implementations, the second conduit 506 may have open ends or closed ends.

Several additional conduits 510 extend from the second conduit 506. Each additional conduit 510 is in fluid communication with the second conduit 506 and the first conduit 504 such that the each conduit 510 can transport the gaseous ammonia received at the inlet 502. In the present example, the plurality of additional conduits 510 are substantially parallel. In addition, each additional conduit 510 of the plurality of additional conduits 510 is substantially perpendicular to the second conduit 506 and substantially parallel to the first conduit 604. Thus, it can be appreciated that the first conduit 504, the second conduit 506, and the plurality of additional conduits 510 may be defined by axes that are substantially coplanar. The plurality of additional conduits 510 are sized such that the ends of the additional conduits 510 form discrete segments for a circular shape such that the gaseous ammonia delivery device 500 may be cross-sectionally disposed within a substantially circular portion (e.g., a tube) of the exhaust system maximizes the dispersal area. In some implementations, each additional conduit 510 may have an open end, opposite the fluid coupling to the second conduit 506, and/or each additional conduit 510 may have a closed end.

The first conduit 504, the second conduit 506, and/or the plurality of additional conduits 510 shown in FIG. 5 are tubular conduits, though any other cross-sectional shape for the first conduit 504, the second conduit 506, and/or the plurality of additional conduits 510 may be used, such as square conduits, rectangular conduits, triangular conduits, elliptical conduits, polygonal conduits, etc. In some implementations, the first conduit 504, the second conduit 506, and/or the plurality of additional conduits 510 may have a hydraulic diameter between one millimeter, inclusive, and five millimeters, inclusive. In some implementations, a cross-member 514 may fluidly couple and be in fluid communication with two or more additional conduits 510 of the plurality of additional conduits 510. In the example shown, a single cross-member 514 is depicted fluidly coupling the two bottom innermost additional conduits 510 together. In other implementations, a pair of cross-members 514 may fluidly couple the two bottom innermost additional conduits 510. In still other implementations, other cross-members 514 may fluidly couple other additional conduits 510. The cross-member 514 may also be omitted.

Each additional conduit 510 of the plurality of additional conduits 510 includes one or more openings 512 along the length of each additional conduit 510. In some implementations, each additional conduit 510 of the plurality of additional conduits 510 includes three or more openings 512. In the example shown in FIG. 5, the outermost additional conduits 510 of the plurality of additional conduits 510 have two openings 512 and the innermost additional conduits 510 of the plurality of additional conduits 510 have six openings 512. The openings 512 may be of any shape, including circular openings, square openings, elliptical openings, triangular openings, rectangular openings, etc. Each opening 512 may have a hydraulic diameter between 0.5 millimeters, inclusive, and 1 millimeter, inclusive.

In some implementations, the diameters of the openings 512 for an additional conduit 510 may vary in size, such as increasing hydraulic diameters along the length of the additional conduit 510 or decreasing hydraulic diameters along the length of the additional conduit 510. For example, a first opening 512 of the plurality of openings 512 of an additional conduit 510 may have a first hydraulic diameter of 0.5 millimeter, a second opening 512 of the plurality of openings 512 may have a second hydraulic diameter of 0.75 millimeter, and a third opening 512 of the plurality of openings 512 may have a third hydraulic diameter of 1 millimeter. In other implementations, the hydraulic diameters of the plurality of openings 512 can vary based on radial distance from a point, such as where the second conduit 506 is coupled to the first conduit 504. In still further implementations, the hydraulic diameters of the plurality of openings 512 may be substantially the same.

The openings 512 may be substantially parallel relative to the flow of the exhaust gas and positioned on the additional conduits 510 away from the flow of the exhaust gas (i.e., on the downstream side of the conduit 510). In other implementations, the openings 512 may be provided on the additional conduits 510 at non-parallel angles relative to the flow of the exhaust gas, such as between 90° (i.e., perpendicular relative to the flow of the exhaust gas), inclusive, and 0° (i.e., parallel relative to the flow of the exhaust gas), inclusive, relative to the flow of the exhaust gas. In some implementations, several openings 512 may be provided at the same vertical location of an additional conduit 510 at multiple angles (e.g., two openings 512 at 45° angles).

In the implementation of the gaseous ammonia delivery device 500 shown in FIG. 5, the device 500 includes several baffles 520. The baffles 520 may include flat members extending from one or more of the additional conduits 510 of the plurality of additional conduits 510. In some implementations, the baffles 520 may have dimensions of five millimeters by ten millimeters. Baffles could be rectangular, circular, triangular, any other closed form shape, or any other configuration. In other implementations, the baffles 520 may have dimensions of five millimeters by fifteen millimeters, ten millimeters by fifteen millimeters, or any other dimension. As shown in FIG. 5, three baffles 520 are provided, including a baffle extending from the cross-member 514. The baffles 520 are configured to enhance turbulence in the flow of the exhaust gas to improve mixing of the dispersed gaseous ammonia and the exhaust gas. In some implementations, guide vanes may also be included to enhance turbulence in the flow of the exhaust gas to improve mixing of the dispersed gaseous ammonia and the exhaust gas. The baffles 520 and/or guide vanes may also be omitted.

Other gaseous ammonia delivery devices, such as those described in U.S. patent application Ser. No. 14/074,154, entitled "Gaseous Reductant Delivery Devices and Systems," filed Nov. 7, 2013, the disclosure of which is incorporated by reference herein in its entirety, may be used to deliver gaseous ammonia or other reductants into the exhaust system 190.

IV. Implementation of Process for Activating Ammonia Generation System

Figure 6:
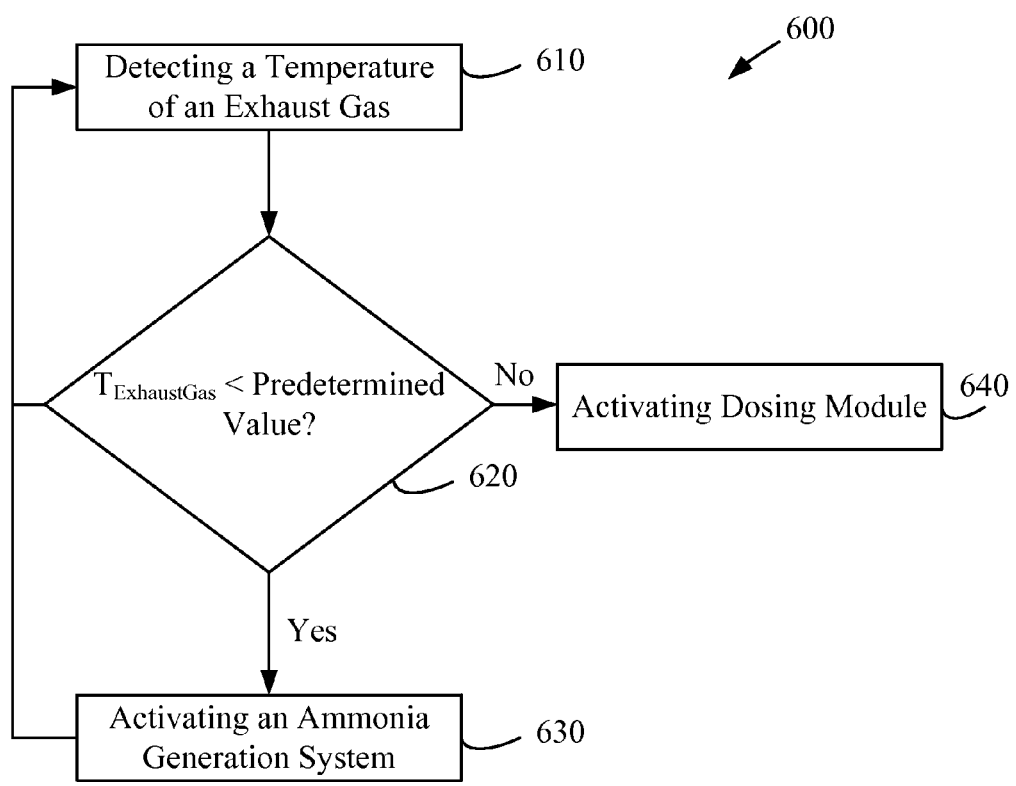
FIG. 6 is a block diagram an implementation of an exemplary process for activating an ammonia generation system.

FIG. 6 is a block diagram of an example process 600 for activating an ammonia generation system for an exhaust system. The process 600 may include detecting a temperature of an exhaust gas (block 610). A temperature sensor, such as temperature sensors 218, 318, 418 may detect a temperature of an exhaust gas flowing in an exhaust system, such as exhaust system 190. Data indicative of the detected temperature may be transmitted to and/or received by a controller, such as controller 120. In some implementations, the data indicative of the detected temperature may be received by a temperature detection module of the controller 120. The data indicative of the detected temperature of the temperature sensor may be modified, either by the temperature sensor or by the controller, to account for offsets or gains affecting the detected temperature.

The process 600 includes determining the temperature of the exhaust gas is below a predetermined value (block 620). In some implementations, the temperature detection module of the controller may be configured to compare the data indicative of the detected temperature to a predetermined value, such as a predetermined value between 150° C., inclusive to 200° C., inclusive. In some implementations, the predetermined value may be 160° C. In other implementations, the predetermined value may be 200° C. If the data indicative of the detected temperature is equal to or below the predetermined value, then the process 600 may proceed to activating an ammonia generation system (block 630). If the data indicative of the detected temperature is above the predetermined value, then the process 600 may return to detecting the temperature of the exhaust gas (block 610). In other implementations, the process 600 may proceed to other operations, such as activating the dosing module 112 (block 640) to dose reductant.

In some implementations, activating the ammonia generation system (block 630) may include activating a pump, such as pump 118, and operating a valve, such as valve 214, 314, to supply liquid reductant to the ammonia generation system, such as ammonia generation system 216, 316. The activation of the ammonia generation system may further include activating one or more components of the ammonia generation system 214, 314 such as activating an ultrasonic transducer for an ammonia generation system 214, 314 configured to generate ammonia via ultrasonic cavitation or activating one or more lasers for an ammonia generation system 214, 314 configured to generate ammonia via laser cavitation. In some implementations, activating the ammonia generation system (block 630) may only include activating one or more components of the ammonia generation system 214, 314 such as activating an ultrasonic transducer for an ammonia generation system 214, 314 configured to generate ammonia via ultrasonic cavitation or activating one or more lasers for an ammonia generation system 214, 314 configured to generate ammonia via laser cavitation. In some implementations, the process 600 may return to detecting the temperature of the exhaust gas (block 610) to detect the exhaust gas temperature. Thus, while the exhaust gas temperature is below the predetermined value, the ammonia generation system may be activated to produce gaseous ammonia. When the exhaust gas temperature exceeds the predetermined value, then the dosing module may be activated to dose reductant. In some implementations, the activation of the ammonia generation system may be responsive to a key-on event (e.g., when a vehicle is activated, but an engine has not been started). In other implementations, the activation of the ammonia generation system may be prior to the starting of an engine.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an exhaust system including a SCR catalyst;
   a reductant source storing reductant; and
   an ammonia generation system configured to generate gaseous ammonia via cavitation, the ammonia generation system operatively connected with the reductant source.

2. The system of claim 1, wherein the ammonia generation system is configured to generate gaseous ammonia via ultrasonic cavitation.

3. The system of claim 2, wherein the ammonia generation system comprises an ultrasonic transducer.

4. The system of claim 2, further comprising:
   a temperature sensor configured to detect a temperature of an exhaust gas of the exhaust system; and
   a controller configured to receive data indicative of the temperature of the exhaust gas from the temperature sensor and activate the ammonia generation system responsive to determining that the received data indicative of the temperature of the exhaust gas is equal to or below a predetermined value.

5. The system of claim 4, wherein the predetermined value is 160° Celsius.

6. The system of claim 4, wherein the predetermined value is 200° Celsius.

7. The system of claim 4, further comprising a valve in fluid communication with and disposed between the ammonia generation system and the reductant source, and wherein the controller is further configured to selectively control the valve to provide reductant from the reductant source to the ammonia generation system responsive to determining that the received data indicative of the temperature of the exhaust gas is equal to or below the predetermined value.

8. The system of claim 7, further comprising a reductant dosing module in fluid communication with the valve, and wherein the controller is further configured to selectively control the valve to provide reductant from the reductant source to the reductant dosing module responsive to determining that the received data indicative of the temperature of the exhaust gas is above the predetermined value.

9. The system of claim 1, wherein the ammonia generation system is configured to generate gaseous ammonia via laser cavitation.

10. The system of claim 9, wherein the ammonia generation system comprises a laser.

11. The system of claim 9, further comprising:
    a temperature sensor configured to detect a temperature of an exhaust gas of the exhaust system; and
    a controller configured to receive data indicative of the temperature of the exhaust gas from the temperature sensor and activate the ammonia generation system responsive to determining that the received data indicative of the temperature of the exhaust gas is equal to or below a predetermined value.

12. The system of claim 11, further comprising:
    a valve in fluid communication with and disposed between the ammonia generation system and the reductant source;
    the controller further configured to selectively control the valve to provide reductant from the reductant source to the ammonia generation system responsive to determining that the received data indicative of the temperature of the exhaust gas is equal to or below the predetermined value.

13. The system of claim 12, further comprising:
    a reductant dosing module in fluid communication with the valve;
    the controller further configured to selectively control the valve to provide reductant from the reductant source to the reductant dosing module responsive to determining that the received data indicative of the temperature of the exhaust gas is above the predetermined value.

14. The system of claim 1 further comprising:
    a gaseous ammonia delivery device in fluid communication with the ammonia generation system and the exhaust system, the gaseous ammonia delivery device upstream of the SCR catalyst.

15. The system of claim 1, wherein the ammonia generation system is configured to generate gaseous ammonia via cavitation responsive to a key-on event.

16. The system of claim 1, wherein the ammonia generation system is configured to generate gaseous ammonia via cavitation prior to starting an engine.

17. An apparatus, comprising:
    a first module configured to receive data indicative of a temperature of an exhaust gas of an exhaust system from a temperature sensor and to determine the received data indicative of the temperature of the exhaust gas is equal to or below a predetermined value;
    a second module configured to activate an ammonia generation system to produce ammonia via cavitation responsive to the first module determining the data indicative of the temperature of the exhaust gas is equal to or below the predetermined value.

18. The apparatus of claim 17, wherein the second module is configured to activate an ultrasonic transducer of the ammonia generation system to produce ultrasonic cavitation in a reductant.

19. The apparatus of claim 18, wherein the predetermined value is equal to or less than 200° Celsius.

20. The apparatus of claim 18, wherein the second module is further configured to selectively control a valve to provide reductant from a reductant source to the ammonia generation system responsive to determining that the received data indicative of the temperature of the exhaust gas is equal to or below the predetermined value and to selectively control the valve to provide reductant from the reductant source to a reductant dosing module responsive to determining that the received data indicative of the temperature of the exhaust gas is above the predetermined value.

21. The apparatus of claim 17, wherein the second module is configured to activate a laser of the ammonia generation system to produce laser cavitation in a reductant.

22. The apparatus of claim 21, wherein the predetermined value is equal to or less than 200° Celsius.

23. The apparatus of claim 21, wherein the second module is further configured to selectively control a valve to provide reductant from a reductant source to the ammonia generation system responsive to determining that the received data indicative of the temperature of the exhaust gas is equal to or below the predetermined value and to selectively control the valve to provide reductant from the reductant source to a reductant dosing module responsive to determining that the received data indicative of the temperature of the exhaust gas is above the predetermined value.

24. A method, comprising:
- receiving, at a controller, data indicative of a temperature of an exhaust gas of an exhaust system from a temperature sensor;
- determining, by the controller, the received data indicative of the temperature of the exhaust gas is equal to or below a predetermined value; and
- selectively activating, using the controller, an ammonia generation system configured to generate ammonia via cavitation responsive to determining the received data indicative of the temperature of the exhaust gas is equal to or below the predetermined value; or
- selectively activating, using the controller, a dosing module responsive to determining the received data indicative of the temperature of the exhaust gas is above the predetermined value.

25. The method of claim 24, wherein activating the ammonia generation system includes activating an ultrasonic transducer of the ammonia generation system to produce ultrasonic cavitation in a reductant or activating a laser of the ammonia generation system to produce laser cavitation in a reductant.

26. The method of claim 25, wherein the predetermined value is equal to or below 200° C.

27. The method of claim 26, wherein selectively activating the ammonia generation system comprises selectively controlling a valve to provide reductant from a reductant source to the ammonia generation system responsive to determining the received data indicative of the temperature of the exhaust gas is equal to or below the predetermined value.

* * * * *